United States Patent
Thomas et al.

(10) Patent No.: US 12,511,258 B2
(45) Date of Patent: Dec. 30, 2025

(54) DYNAMIC STORAGE OF SEQUENCING DATA FILES

(71) Applicant: Helix, Inc., San Mateo, CA (US)

(72) Inventors: Tom Thomas, San Francisco, CA (US); Feng Liu, Burnaby (CA)

(73) Assignee: Helix, Inc., San Mateo, CA (US)

( * ) Notice: Subject to any disclaimer, the term of this patent is extended or adjusted under 35 U.S.C. 154(b) by 19 days.

(21) Appl. No.: 18/386,546

(22) Filed: Nov. 2, 2023

(65) Prior Publication Data
US 2025/0147928 A1    May 8, 2025

(51) Int. Cl.
*G06F 16/17*    (2019.01)
*G06F 16/11*    (2019.01)

(52) U.S. Cl.
CPC ........ *G06F 16/1734* (2019.01); *G06F 16/116* (2019.01)

(58) Field of Classification Search
CPC .......................... G06F 16/1734; G06F 16/116
See application file for complete search history.

(56) References Cited

U.S. PATENT DOCUMENTS

| | | | |
|---|---|---|---|
| 2005/0158742 A1* | 7/2005 | Sugiyama | G16B 30/00 435/6.1 |
| 2011/0029836 A1* | 2/2011 | Dhuse | G06F 11/1076 714/752 |
| 2017/0177597 A1* | 6/2017 | Asimenos | G06F 16/188 707/737 |
| 2017/0351700 A1* | 12/2017 | Takata | H04L 67/1095 707/737 |
| 2019/0129769 A1* | 5/2019 | Frech | G06F 8/34 707/737 |
| 2021/0005284 A1* | 1/2021 | Nuzhdina | G16B 20/20 707/737 |
| 2024/0127907 A1* | 4/2024 | Brislawn | G16H 50/20 707/737 |

OTHER PUBLICATIONS

What is Amazon S3 Glacier? https://docs.awsamazon.com/amazonglacier/latest/dev/introduction.html; Oct. 31, 2023.

* cited by examiner

*Primary Examiner* — Yuk Ting Choi
(74) *Attorney, Agent, or Firm* — Duft & Bornsen, PC

(57) ABSTRACT

Apparatus and method of managing genomic sequencing data. In an embodiment, a data management controller is communicatively coupled to an external data repository over a communication network. The data management controller is configured to detect a first event triggering initial analysis on raw sequence data encoded in a standard file format and stored in the external data repository. The data management controller is configured to launch one or more analysis tools to perform the initial analysis on the raw sequence data stored in the external data repository, and to output initial analysis results. The data management controller is configured to determine whether the initial analysis results pass quality control, and control electronic storage of the raw sequence data when the initial analysis results pass quality control by storing the raw sequence data in archive storage, and deleting the raw sequence data from the external data repository.

20 Claims, 12 Drawing Sheets

DYNAMIC STORAGE OF SEQUENCING DATA FILES

TECHNICAL FIELD

The following disclosure relates to the field of bioinformatics, and more particularly, to handling of sequencing data.

BACKGROUND

Bioinformatics is a scientific field related to the development or application of tools or applications to analyze and interpret biological data, such as DNA (deoxyribonucleic acid) sequences. The raw sequence data generated from DNA sequencing processes can be quite large, and standard file formats for raw sequence data occupy a substantial amount of space in memory for storage. For example, a standard file format for raw sequence data may occupy two to ten gigabytes of memory for each file. This makes long-term storage of genomic data on a population-scale prohibitive both in terms of capacity and expense.

SUMMARY

Embodiments described herein provide dynamic storage solutions for raw sequence data encoded in a standard file format. As a general overview, raw sequence data is dynamically moved between an external data repository and archive storage as needed for data analysis. For example, after an initial analysis of raw sequence data, the raw sequence data may be moved to archive storage and removed from the external data repository. One technical benefit is the raw sequence data may be stored long term and re-analyzed if desired. Thus, new or different types of genetic analysis may be performed on the raw sequence data. Another technical benefit is the use of archive storage reduces storage costs for the raw sequence data.

In an embodiment, an apparatus is configured to manage genomic sequencing data. The apparatus comprises a data management controller communicatively coupled to an external data repository over a communication network. The data management controller comprises a processor and memory, and the processor is configured to detect a first event triggering initial analysis on raw sequence data encoded in a standard file format, where the raw sequence data is stored in the external data repository. The processor is further configured to launch one or more analysis tools to perform the initial analysis on the raw sequence data stored in the external data repository, and to output initial analysis results. The processor is further configured to determine whether the initial analysis results pass quality control, and control electronic storage of the raw sequence data when the initial analysis results pass quality control by storing the raw sequence data in archive storage, and deleting the raw sequence data from the external data repository.

In an embodiment, the processor is further configured to detect a second event triggering re-analysis on the raw sequence data, and identify a storage location of the raw sequence data. When the storage location is in the external data repository, the processor is further configured to launch the analysis tools to perform the re-analysis on the raw sequence data, and to output updated analysis results. When the storage location is in the archive storage, the processor is further configured to initiate a restore of the raw sequence data from the archive storage, wait a threshold time period for the raw sequence data to be restored from the archive storage, and launch the analysis tools to perform the re-analysis on the raw sequence data, and to output the updated analysis results.

In an embodiment, a method of managing genomic sequencing data comprises detecting a first event triggering initial analysis on raw sequence data encoded in a standard file format, where the raw sequence data is stored in an external data repository accessible over a communication network. The method further comprises launching one or more analysis tools to perform the initial analysis on the raw sequence data stored in the external data repository, and to output initial analysis results. The method further comprises determining whether the initial analysis results pass quality control, and controlling electronic storage of the raw sequence data when the initial analysis results pass quality control by storing the raw sequence data in archive storage, and deleting the raw sequence data from the external data repository.

In an embodiment, the method further comprises detecting a second event triggering re-analysis on the raw sequence data, and identifying a storage location of the raw sequence data. When the storage location is in the external data repository, the method further comprises launching the analysis tools to perform the re-analysis on the raw sequence data, and to output updated analysis results. When the storage location is in the archive storage, the method further comprises initiating a restore of the raw sequence data from the archive storage, waiting a threshold time period for the raw sequence data to be restored from the archive storage, and launching the analysis tools to perform the re-analysis on the raw sequence data, and to output the updated analysis results.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
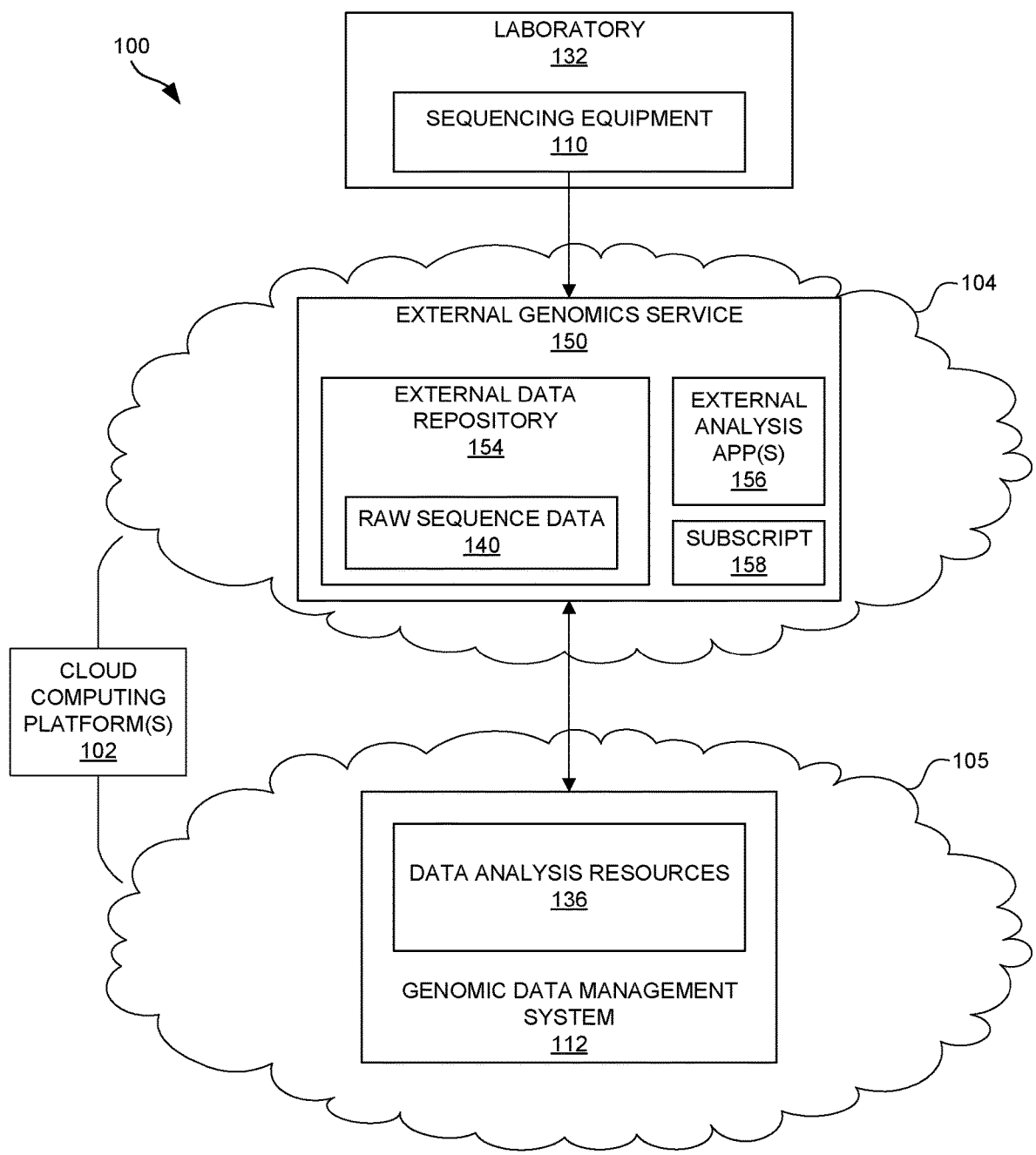
FIG. 1 is a block diagram of a bioinformatics system in an illustrative embodiment.

FIG. 1 is a block diagram of a bioinformatics system 100 in an illustrative embodiment. At a high level, bioinformatics system 100 comprises any combination of systems, components, devices and/or computer technology to collect, store, and/or analyze genomic data. In an embodiment, bioinformatics system 100 includes sequencing equipment 110. Sequencing equipment 110 (also referred to as a sequencing instrument, a sequencing platform, a next-generation sequencing (NGS) platform, etc.) may be implemented in a laboratory 132, and is configured to perform a sequencing process on biological samples. For example, DNA sequencing is a process of determining an exact sequence of nucleotides, or bases, in a DNA molecule. Sequencing equipment 110 may therefore include a DNA sequencer and/or other instruments configured to determine the order of the four bases: G (guanine), C (cytosine), A (adenine), and T (thymine). Genomic sequencing is a process of determining the entire genetic makeup of an organism.

Bioinformatics system 100 further includes an external genomics service 150 that comprises an external data repository 154, and may further comprise one or more external analysis applications 156. External genomics service 150 is a type of service for analysis, storage, and sharing of genomics data. For example, the output of sequencing equipment 110 is raw sequence data 140 that is stored in external data repository 154. The raw sequence data 140 may be streamed directly from sequencing equipment 110 to external data repository 154, and the external analysis applications 156 may be used to analyze the raw sequence data 140. It may be assumed that external genomics service 150 is a fee-based service, such as a subscription-based service where a subscription 158 is obtained to receive the external genomics service 150.

External genomics service 150 is hosted on a (first) cloud infrastructure 104 of a cloud computing platform 102. Cloud computing is the delivery of computing resources, including storage, processing power, databases, networking, analytics, artificial intelligence, and software applications, over an internet connection. Some examples of cloud computing platform 102 may comprise Amazon Web Services (AWS), Google Cloud, Microsoft Azure, etc. Technical benefits of a cloud computing platform 102 are little or no upfront costs, high levels of security, and scalability. Cloud infrastructure 104 is a collection of hardware and/or software resources to provide the external genomics service 150.

Bioinformatics system 100 further includes a genomic data management system 112. Genomic data management system 112 is an apparatus, server, hardware, software, etc., configured to manage genomic data. For example, genomic data management system 112 may manage raw sequence data 140 in external data repository 154 that is accessible over a communication network. Genomic data management system 112 comprises data analysis resources 136. Data analysis resources 136 are configured to perform data analysis on the genomic data, such as raw sequence data 140 generated by sequencing equipment 110. For data analysis, the raw sequence data 140 may be fed to an analytics pipeline, such as to perform alignment of sequence reads to a reference sequence, perform variant calling on the aligned sequence data, perform annotation of the variant calls, etc. Data analysis resources 136 may comprise internal or local resources of genomic data management system 112, and/or may comprise or use external analysis applications 156. Genomic data management system 112 may be hosted on a (second) cloud infrastructure 105 of a cloud computing platform 102. Cloud infrastructure 105 is a collection of hardware and/or software resources that provide functions of genomic data management system 112. However, one or more functions of genomic data management system 112 may be implemented on a hardware or server-based platform.

The cloud infrastructure 105 is shown as separate or distinct from the cloud infrastructure 104 of external genomics service 150. For example, genomic data management system 112 may be provided by one company or entity, while external genomics service 150 may be provided by a different or separate company or entity, such as for a fee. Thus, external genomics service 150 is considered "external" to genomic data management system 112. Cloud computing platform 102 depicts a general cloud computing environment, as cloud infrastructures 104-105 may be on a common cloud computing platform 102, such as AWS, or on different cloud computing platforms 102.

Figure 2:
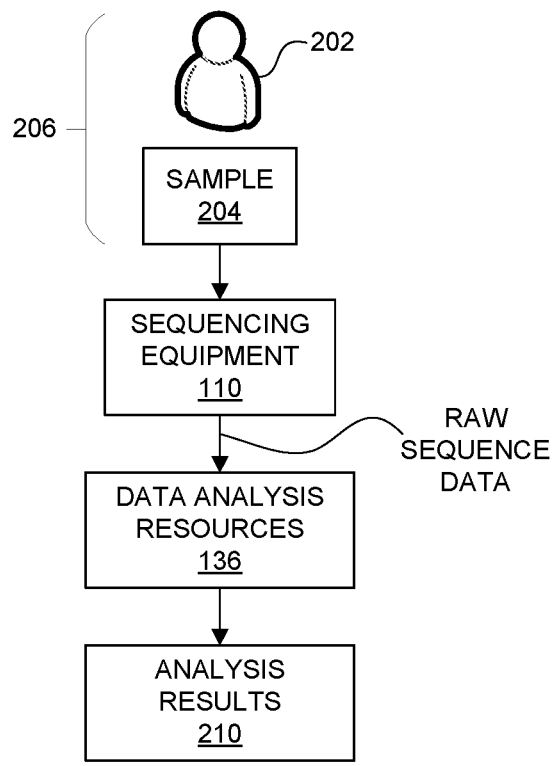
FIG. 2 is a block diagram illustrating genomic sequencing in an illustrative embodiment.
Figure 3:
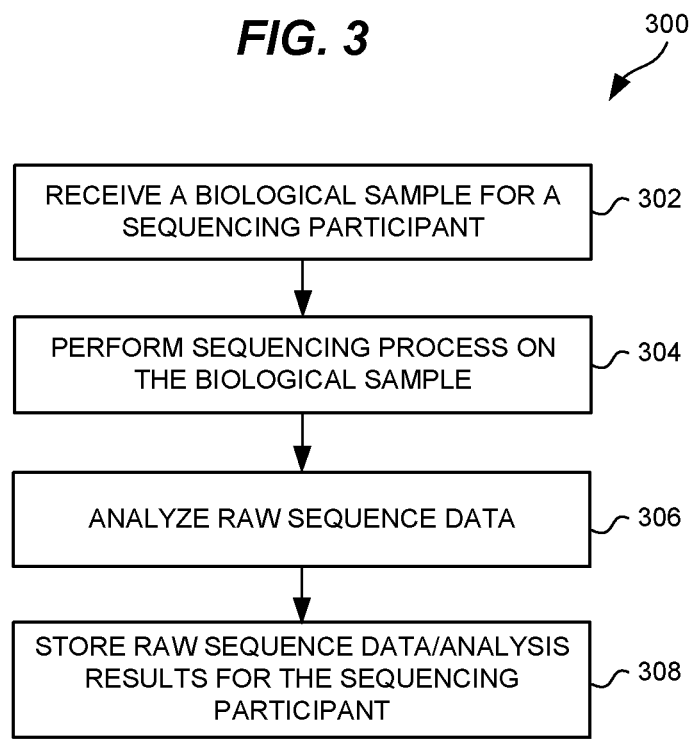
FIG. 3 is a flow chart illustrating a method of genomic sequencing in an illustrative embodiment.

FIG. 2 is a block diagram illustrating genomic sequencing in an illustrative embodiment. FIG. 3 is a flow chart illustrating a method 300 of genomic sequencing in an illustrative embodiment. The steps of the flow charts described herein are not all inclusive and may include other steps not shown, and the steps may be performed in an alternative order. A biological sample 204 (e.g., blood, saliva, etc.) of an individual 202 is received at laboratory 132 for sequencing (step 302). An individual 202 that volunteers or consents to genomic sequencing of a biological sample 204 is referred to as a sequencing participant 206. The sequencing equipment 110 at laboratory 132 performs a sequencing process on the biological sample 204 to generate raw sequence data 140 associated with the sequencing participant 206 (step 304). The data analysis resources 136 may then analyze or otherwise process the raw sequence data 140, such as alignment, variant calling, etc. (step 306). The analysis process generates analysis results 210 (also referred to as diagnostic results, analysis data, analysis output, etc.), such as variant information. The raw sequence data 140 and analysis results 210, such as variant information, may be collectively referred to as genomic sequencing data 208 for, or associated with, a sequencing participant 206. The genomic sequencing data 208 may comprise data for a whole genome, a subset of the genes that make up a genome, etc. The raw sequenced data 140 and/or analysis results 210 are stored in secure data storage (step 308), such as in an external data repository 154 as shown in FIG. 1 and/or a data repository of genomic data management system 112.

Figure 4:
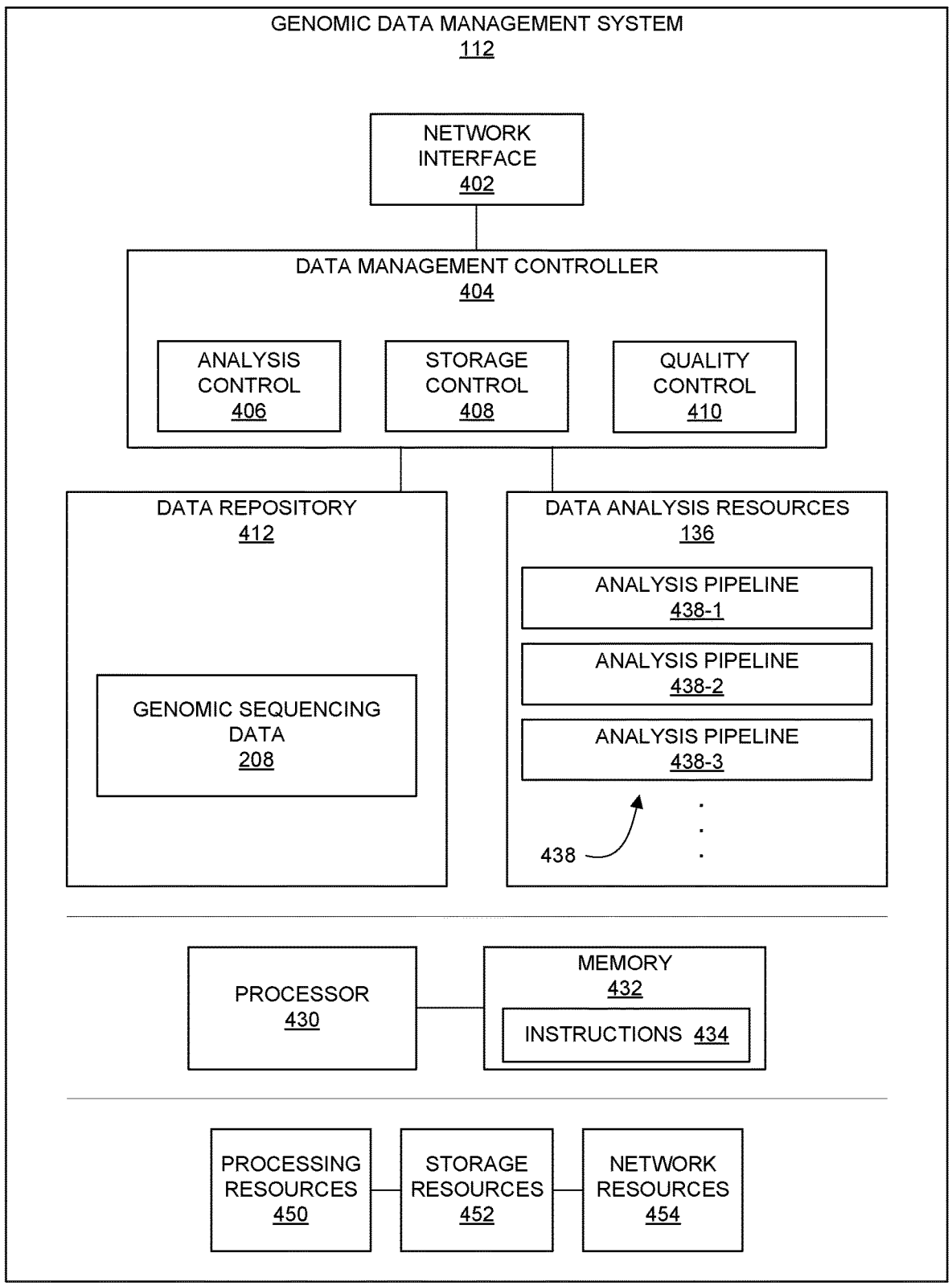
FIG. 4 is a block diagram of genomic data management system in an illustrative embodiment.

FIG. 4 is a block diagram of genomic data management system 112 in an illustrative embodiment. In an embodiment, genomic data management system 112 includes the following subsystems: a network interface component 402, a data management controller 404, data repository 412, and data analysis resources 136 that operate on one or more platforms. Network interface component 402 may comprise circuitry, logic, hardware, means, etc., configured to exchange messages with external devices or systems. Network interface component 402 may operate using a variety of protocols. Data management controller 404 may comprise circuitry, logic, hardware, means, etc., configured to manage storage and/or processing of genomic sequencing data. For example, data management controller 404 may provide analysis control 406, which controls or manages data analysis of raw sequence data 140 and/or other genomic sequencing data. Data management controller 404 may provide storage control 408, which controls or manages storage of raw sequence data 140 and/or other genomic sequencing data. Data management controller 404 may provide quality control 410, which controls or manages quality control procedures for analysis results resulting from data analysis of raw sequence data 140 and/or other genomic sequencing data. Data management controller 404 is communicatively coupled to external data repository 154, data repository 412, and data analysis resources 136, such as over a system bus, an Application Programming Interface (API), a Command Line Interface (CLI), etc. Data repository 412 comprises secure data storage configured to store the raw sequence data 140 and/or other genomic sequencing data. Data analysis resources 136 are configured to perform data analysis on the raw sequence data 140 and/or other genomic sequencing data. As described above, data analysis resources 136 may comprise internal or local resources of genomic data management system 112, and/or may comprise one or more external analysis applications 156 of external genomics service 150.

One or more of the subsystems of genomic data management system 112 may be implemented on a hardware platform comprised of analog and/or digital circuitry. For example, network interface component 402, data management controller 404, and/or one or more data analysis resources 136 may be implemented on one or more processors 430 that execute instructions 434 (i.e., computer readable code) for software that are loaded into memory 432. A processor 430 comprises an integrated hardware circuit configured to execute instructions 434 to provide the functions of genomic data management system 112. Processor 430 may comprise a set of one or more processors or may comprise a multi-processor core, depending on the particular implementation. Memory 432 is a non-transitory computer readable storage medium for data, instructions, applications, etc., and is accessible by processor 430. Memory 432 is a hardware storage device capable of storing information on a temporary basis and/or a permanent basis. Memory 432 may comprise a random-access memory, or any other volatile or non-volatile storage device.

One or more of the subsystems of genomic data management system 112 may be implemented on cloud computing platform 102 (e.g., AWS) or another type of processing platform. Cloud resources of cloud infrastructure 105 may be provisioned on cloud computing platform 102, such as processing resources 450 (e.g., physical or hardware processors, a server, a virtual server or virtual machine (VM), a virtual central processing unit (vCPU), etc.), storage resources 452 (e.g., physical or hardware storage, virtual storage, etc.), and/or networking resources 454, although other resources are considered herein. Genomic data management system 112 may be built upon the provisioned resources with instructions, programming, code, etc. For example, network interface component 402 may be provisioned on networking resources 454, data management controller 404 and/or one or more data analysis resources 136 may be provisioned on processing resources 450, and data repository 412 may be provisioned on storage resources 452.

Genomic data management system 112 may include various other components not specifically illustrated in FIG. 4.

Figure 5A:
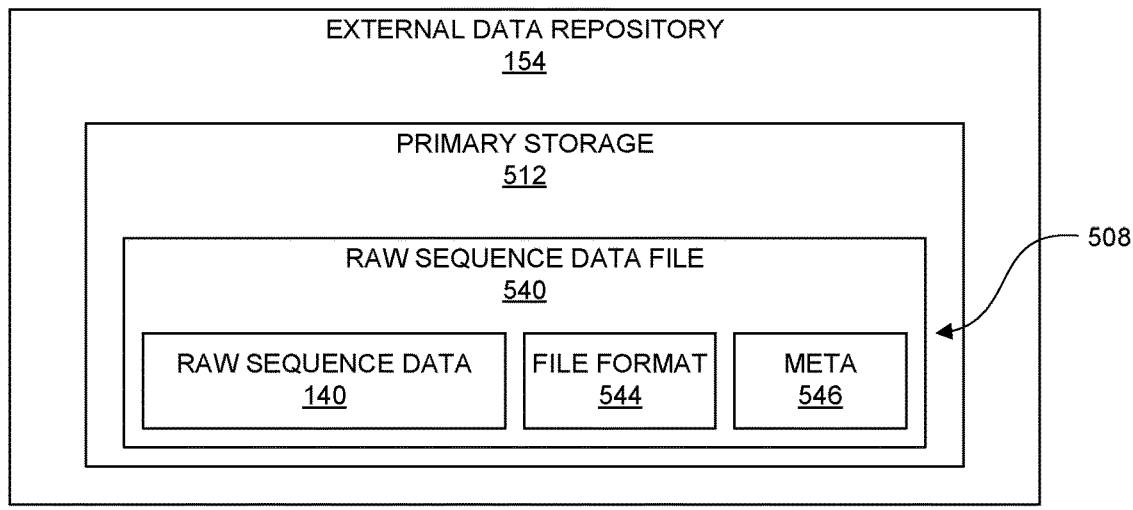
FIGS. 5A-5B are block diagrams illustrating external data repository and data repository in an illustrative embodiment.
Figure 5B:
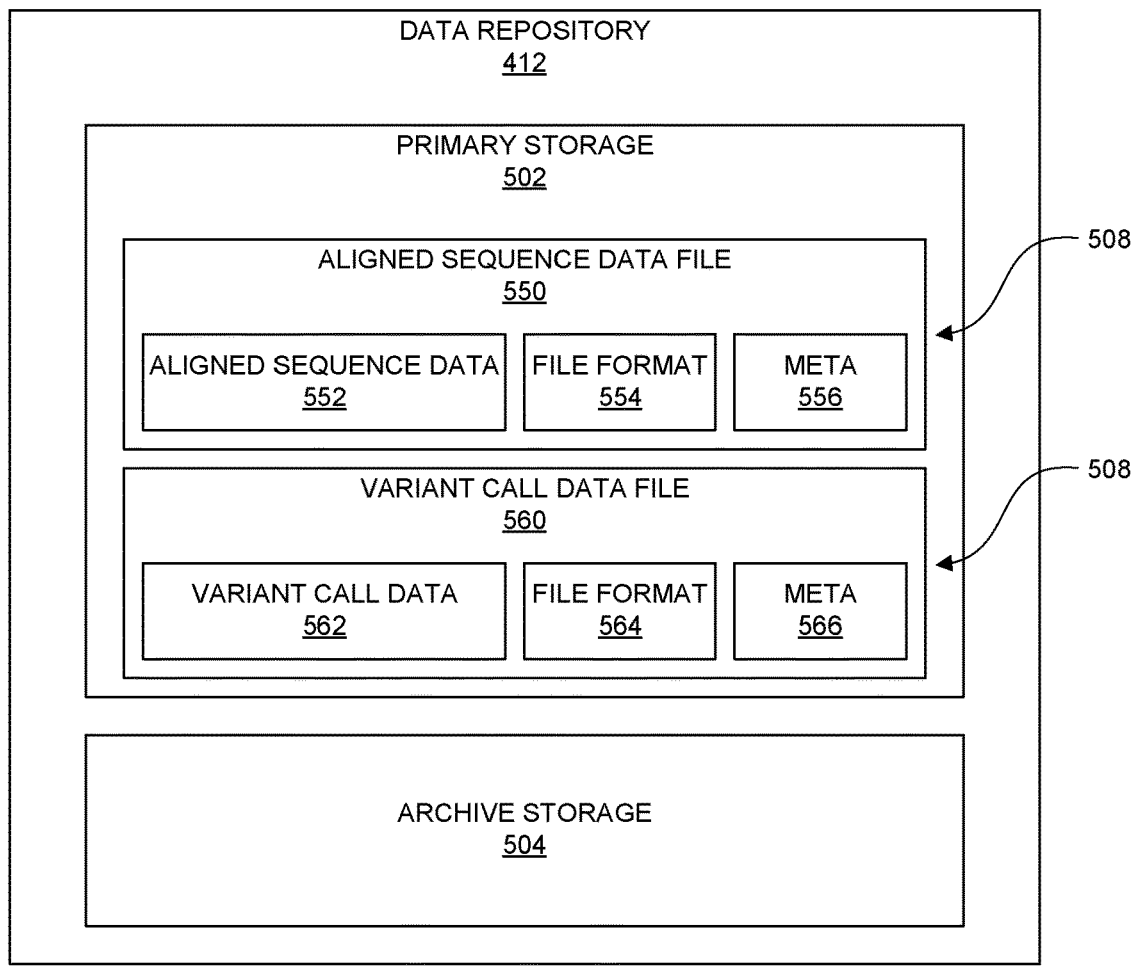

FIGS. 5A-5B are block diagrams illustrating external data repository 154 and data repository 412 in an illustrative embodiment. In FIG. 5A, external data repository 154 comprises primary storage 512 configured to store genomic sequencing data 508. Primary storage 512 (also referred to as active storage) comprises a type or class of storage where data is accessible or available in substantially real-time. In FIG. 5B, data repository 412 comprises primary storage 502 and archive storage 504 configured to store genomic sequencing data 508. Archive (or archival) storage 504 comprises a type or class of storage where data is not accessible or available in real-time. For example, genomic sequencing data 508 stored in archive storage 504 is accessible using a retrieval process over a retrieval time (e.g., twelve hours or another retrieval time greater than two hours, for example). Archive storage 504 is generally used for data that is accessed occasionally or infrequently.

In an embodiment, the genomic sequencing data 508 may comprise one or more electronic data files, which may be referred to generally as sequencing data files. For example, the sequencing data files may comprise a raw sequence data file 540, which is illustrated as stored in external data repository 154. A raw sequence data file 540 contains raw sequence data 140. The raw sequence data 140 is encoded in the raw sequence data file 540 according to a standard file format 544, such as FASTQ format. Raw sequence data file 540 may further include metadata 546 (META) comprising additional information regarding the raw sequence data file 540, such as a storage location of the raw sequence data file 540, analysis tools used to process the raw sequence data file 540, a version of the analysis tools used to process the raw sequence data file 540, etc. In another example, the sequencing data files may comprise an aligned raw sequence data file 550 and a variant call data file 560, which are illustrated as stored in data repository 412. An aligned raw sequence data file 550 contains aligned sequence data 552. The aligned sequence data 552 is encoded in the aligned raw sequence data file 550 according to a file format 554, such as sequence alignment map (SAM) or binary alignment map (BAM) format. Aligned raw sequence data file 550 may further include metadata 556 comprising additional information regarding the aligned raw sequence data file 550. A variant call data file 560 contains variant call data 562. The variant call data 562 is encoded in the variant call data file 560 according to a file format 564, such as Variant Call Format (VCF). Variant call data file 560 may further include metadata 566 comprising additional information regarding the variant call data file 560. The genomic sequencing data 508 may include additional electronic data files in other file formats as desired, such as Compressed Reference-oriented Alignment Map (CRAM).

In an embodiment, data management controller 404 may dynamically move electronic data files between external data repository 154 of external genomics service 150, and archive storage 504, such as based on local policy or criteria. One technical benefit is the use of archive storage 504 can reduce storage costs for genomic sequencing data 508. For example, a raw sequence data file 540, such as a FASTQ file, and an aligned raw sequence data file 550, such as SAM or BAM files, may be large (e.g., two to ten gigabytes) in comparison to a variant call data file 560, such as a VCF file. Thus, data management controller 404 may move raw sequence data files 540 and/or aligned sequence data files 550 from external genomics service 150 to archive storage 504 after data analysis is performed to reduce overall storage costs for the genomic sequencing data 508.

Figure 6:
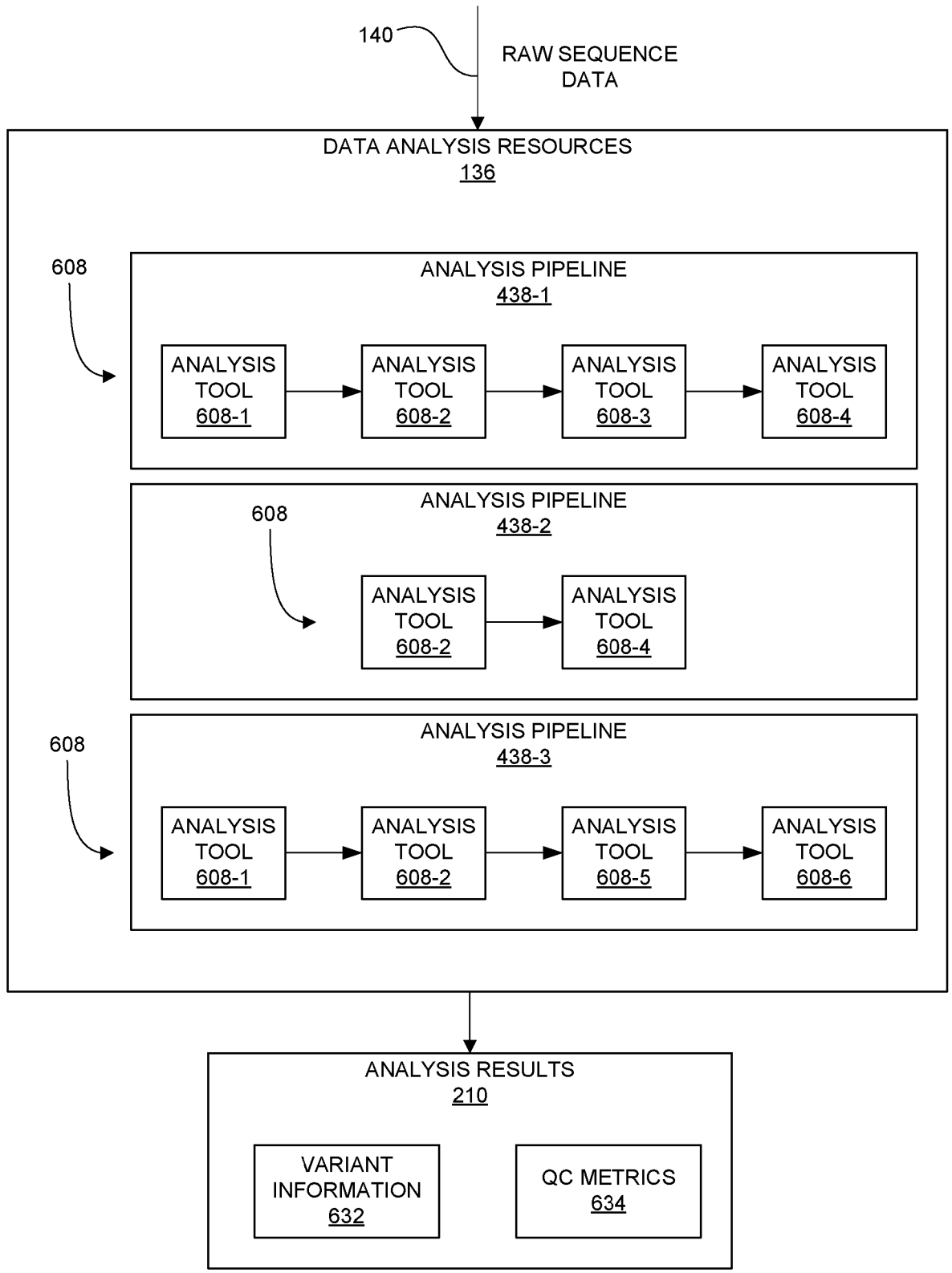
FIG. 6 is a block diagram illustrating data analysis resources in an illustrative embodiment.

In FIG. 4, data analysis resources 136 may process raw sequence data 140 by feeding the raw sequence data 140 to an analysis pipeline 438. Data analysis resources 136 may support one or multiple analysis pipelines 438 (e.g., analysis pipelines 438-1, 438-2, 438-3, etc.). FIG. 6 is a block diagram illustrating data analysis resources 136 in an illustrative embodiment. An analysis pipeline 438 comprises a set of data processing elements that receives raw sequence data 140 as input, and outputs analysis results 210. In an embodiment, the analysis results 210 may comprise variant information 632, such as a VCF file, Quality Control (QC) metrics 634 generated by an analysis pipeline 438, and/or other information or output. In an embodiment, an analysis pipeline 438 includes one or more analysis tools 608. For example, analysis pipeline 438-1 includes analysis tools 608-1, 608-2, 608-3, and 608-4. Analysis pipeline 438-2 includes analysis tools 608-2 and 608-4. Analysis pipeline 438-3 includes analysis tools 608-1, 608-2, 608-5, and 608-6. Each analysis pipeline 438 may process the raw sequence data 140 differently to produce analysis results 210. Data management controller 404, as in FIG. 4, may select an analysis pipeline 438 based on a local policy or criteria.

Figure 7:
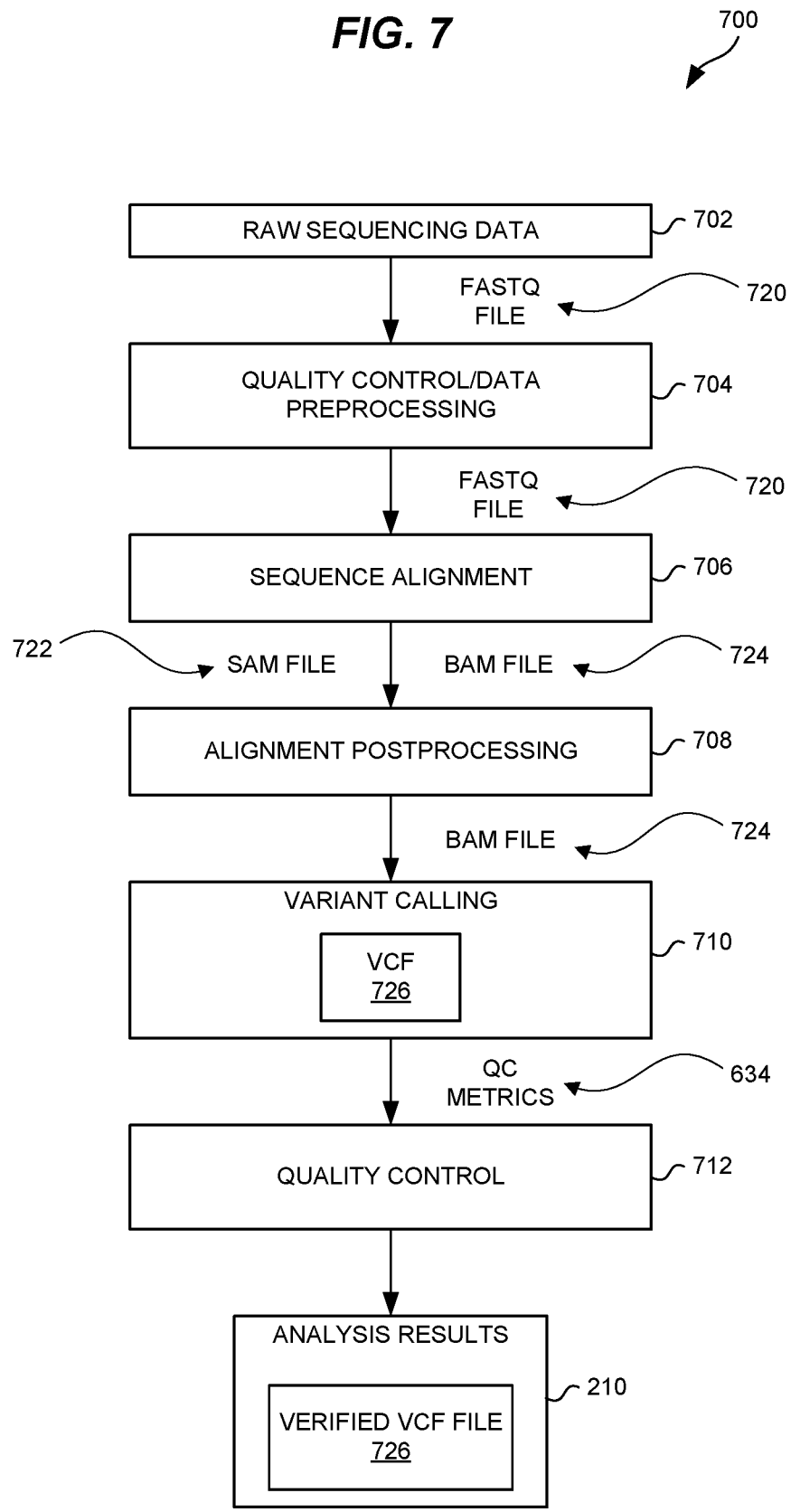
FIG. 7 is a flow chart illustrating a method of performing data analysis of raw sequencing data in an illustrative embodiment.
Figure 8:
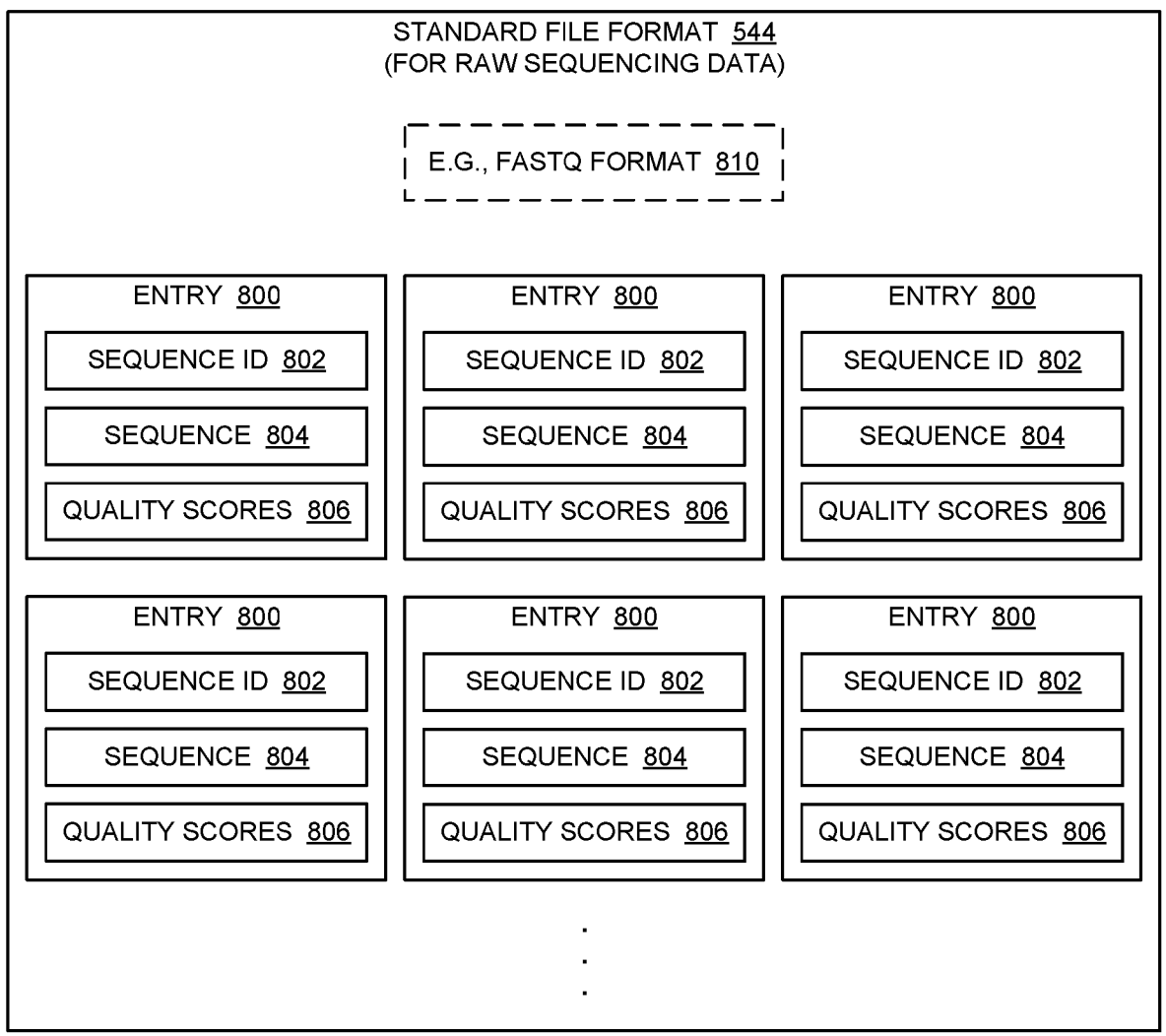
FIG. 8 is a block diagram of a standard file format for raw sequencing data in an illustrative embodiment.

FIG. 7 is a flow chart illustrating a method 700 of performing data analysis of raw sequence data 140 in an illustrative embodiment. In this embodiment, an analysis pipeline 438 may be selected for variant calling. To begin, raw sequencing data 140 is received (step 702), such as from sequencing equipment 110. The raw sequencing data 140 may be received in a raw sequence data file 540 encoded in a standard file format 544, such as a FASTQ file 720. Otherwise, the raw sequencing data 140 may be converted to the standard file format 544. FIG. 8 is a block diagram of a standard file format 544 for raw sequencing data 140 in an illustrative embodiment. In general, the standard file format 544 for raw sequencing data 140 contains sequence information and corresponding quality scores. An entry 800 of the standard file format 544 includes a sequence identifier (ID) 802, and a sequence 804 of nucleotides or bases (e.g., "TCGCACTCAACGCCCTGCATATGACAA-GACAGAATC"), which is also referred to as a "read" or "sequence read". An entry 800 further includes quality scores 806 (i.e., uncertainty of base calls) for the sequence 804. The quality scores 806 may be used together with the sequence 804 for subsequent analysis. One example of the standard file format 544 is FASTQ format 810.

In FIG. 7, the raw sequencing data 140 may contain biases and/or complex artifacts depending on the platform used for base calling. Thus, one or more analysis tools 608 may perform quality control (QC) and/or data preprocessing on the raw sequencing data 140 (step 704). For quality control, for example, an analysis tool 608 may generate summary statistics assessing the overall quality of the raw sequencing data 140. An analysis tool 608 may preprocess the raw sequencing data 140 to remove reads (i.e., sequences 804 corresponding to all or part of a single DNA fragment) having quality scores 806 below a quality threshold, remove adapter sequences, remove sequences 804 with fewer than a threshold number of bases, etc.

An analysis tool 608 may then perform sequence alignment on the (preprocessed) raw sequencing data 140 (step 706). Sequence alignment is a process of mapping the sequences 804 to a reference genome or reference sequences. The analysis tool 608 that performs sequence alignment may output aligned sequence data 552 in a SAM file 722, which is a type of text file format containing alignment information of various sequences 804 mapped against reference sequences. In a subsequent step, a SAM file 722 may be converted into a BAM file 724, which is a compressed binary version of a SAM file 722 used to represent aligned sequences. An analysis tool 608 may also perform quality control (QC) of the BAM file 724, such as to evaluate key sequencing metrics, verify sufficient sequencing coverage was achieved, detect evidence of contamination, etc.

An analysis tool 608 may then perform alignment post-processing on the aligned sequencing data (step 708). Sequence alignments may be processed to detect and correct incorrect alignments in order to minimize artifacts in the downstream analyses. An analysis tool 608 may then perform variant calling on the aligned sequencing data (step 710). Variant calling is a process of identifying differences between a sequence 804 and the reference sequence. The variants may include single nucleotide polymorphisms (SNPs), insertions/deletions (indels), and structural variations. The analysis tool 608 that performs variant calling outputs variant call data 562 in a VCF file 726, which is a type of text file format containing variation data (i.e., indicating the variants).

An analysis tool 608 may then perform quality control on QC metrics 634 generated by the analysis pipeline 438 and/or other data associated with the VCF file 726 (step 712). For example, the analysis tool 608 may remove false positives from the initial variant data set. The analysis tool 608 may compare the initial variant data set to certain metrics (e.g., probabilistic likelihood or unlikelihood of certain variant data). After quality control is passed, the analysis results 210 output by the analysis pipeline 438 includes a verified VCF file 726. The verified VCF file 726 may then be stored, such as in data repository 412. The FASTQ file 720, the SAM file 722, the BAM file 724, and any other electronic data files may also be stored in external data repository 154 and/or data repository 412.

Figure 9A:
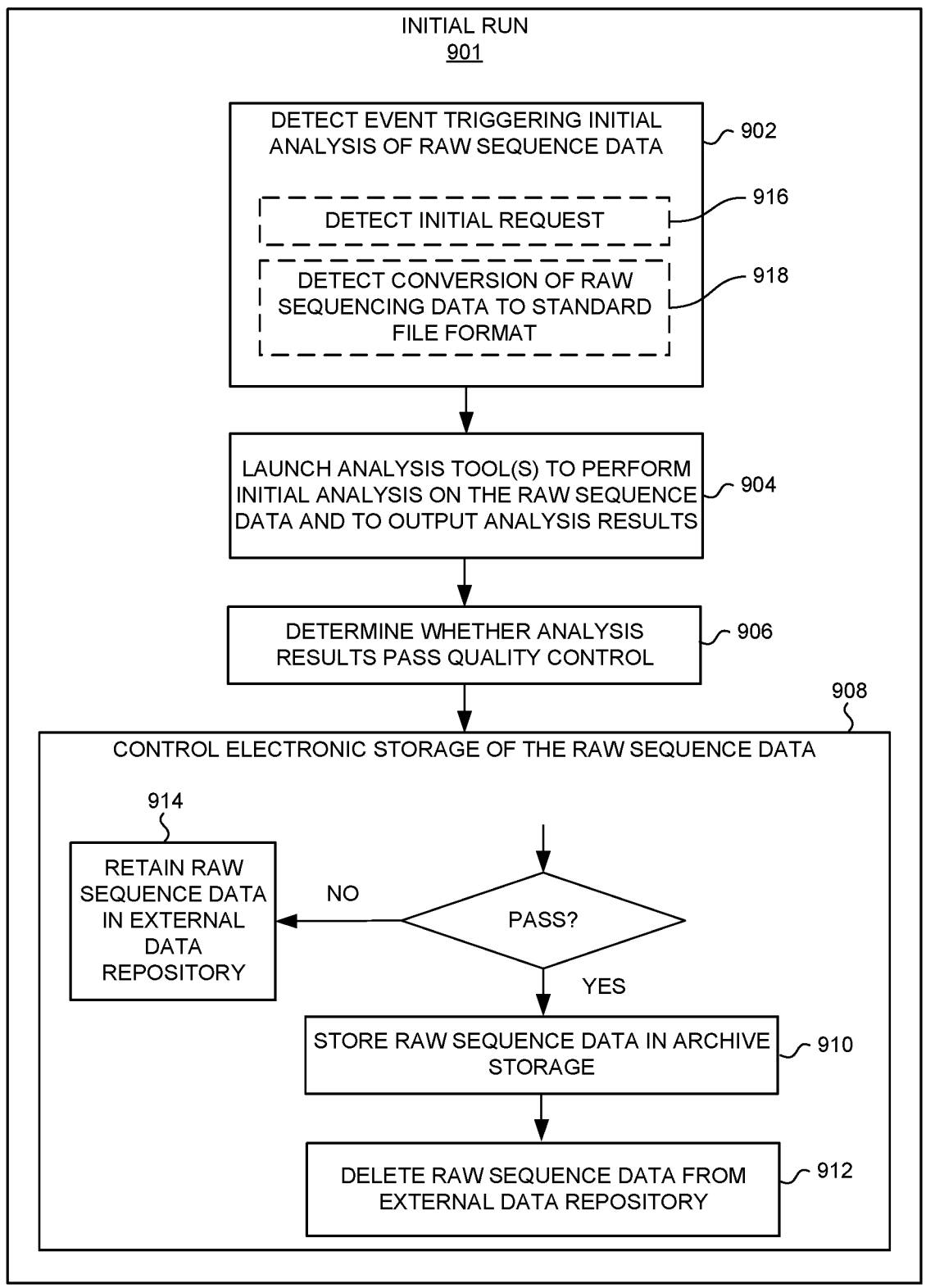
FIGS. 9A-9B are flow charts illustrating a method of managing genomic sequencing data in an illustrative embodiment.
Figure 9B:
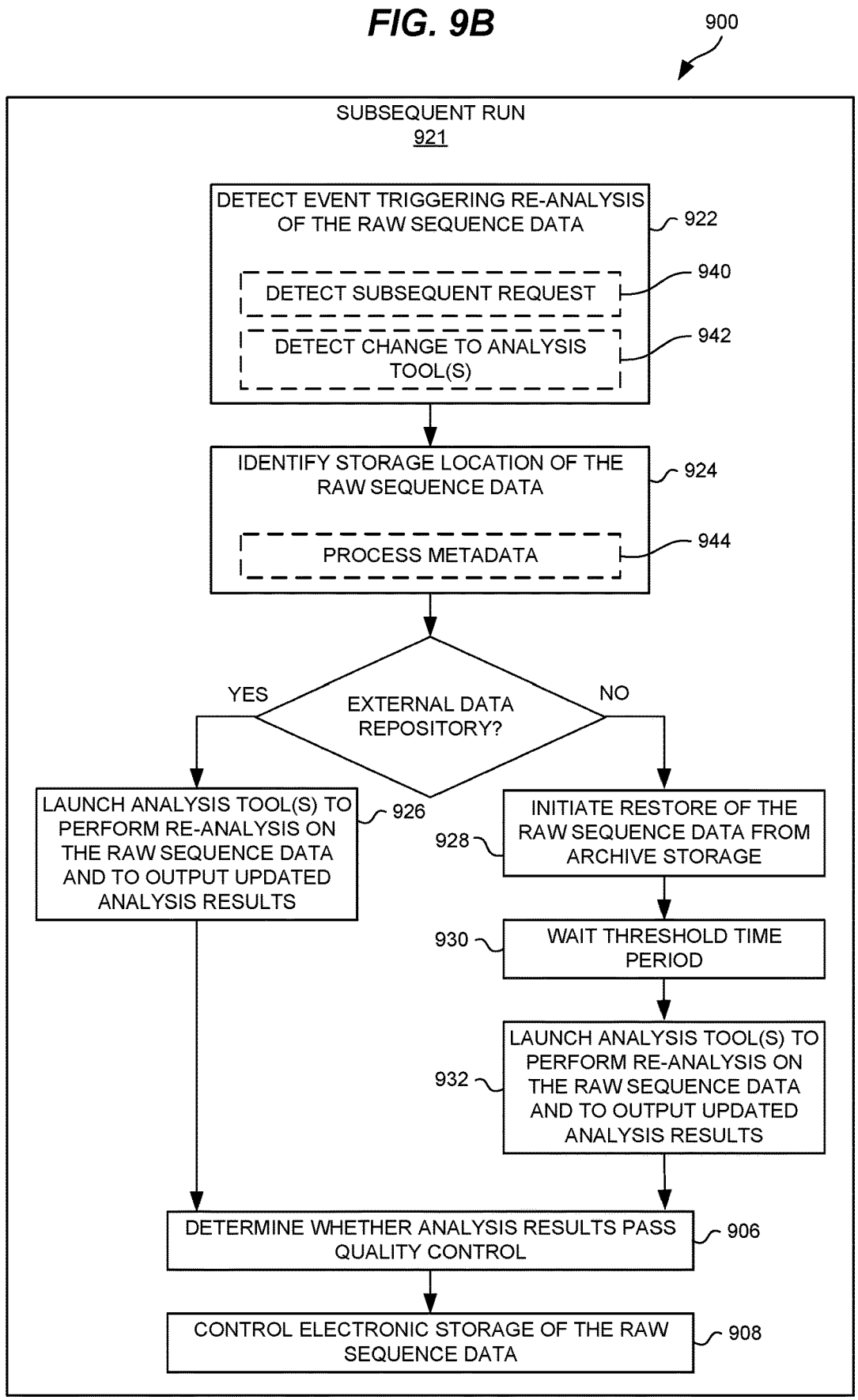

FIGS. 9A-9B are flow charts illustrating a method 900 of managing genomic sequencing data 508 in an illustrative embodiment. The method 900 in FIGS. 9A-9B is described with reference to genomic data management system 112, although the method 900 may be performed by other systems in other embodiments. Assume, for example, that a sample 204 is received for a sequencing participant 206, and a sequencing process is performed on the sample 204 to generate raw sequencing data 140 for the sequencing participant 206. The sample 204 may be accompanied by a request from a health care provider or the like for analysis results 210 regarding the sequencing participant 206.

The steps in FIG. 9A represent a first or initial run 901 of data analysis on the raw sequence data 140. Data management controller 404 detects an event triggering initial analysis on the raw sequence data 140 (step 902). For the initial run 901, the raw sequence data 140 is stored in external data repository 154 (i.e., primary storage 512) of external genomics service 150, and is encoded in or converted to a standard file format 544 (e.g., FASTQ format 810). In other words, the raw sequence data 140 is contained in a raw sequence data file 540 (e.g., FASTQ file 720) in standard file format 544. As described above, the standard file format 544 for raw sequence data 140 comprises entries 800 that each include a sequence 804 of bases and corresponding quality scores 806. The event triggering initial analysis on the raw sequence data 140 may vary depending on programming and/or operating conditions. In one example, data management controller 404 may detect an initial request to perform data analysis on the raw sequence data 140 (optional step 916), such as from a health care provider or the like. In another example, data management controller 404 may detect conversion of the raw sequence data 140 from a non-standard file format to the standard file format 544 (optional step 918). However, other triggering events are considered herein.

In response to a triggering event, data management controller 404 launches one or more analysis tools 608 to perform the initial analysis on the raw sequence data 140 stored in external data repository 154 of the external genomics service 150, and to output, generate, or produce initial analysis results 210 (step 904). For example, data management controller 404 may select or identify an analysis pipeline 438 for the initial run 901 of data analysis, and execute function calls or the like to feed the raw sequence data 140 through the analysis pipeline 438 to produce the analysis results 210 (e.g., variant calls or VCF file 726). Data management controller 404 may then determine whether the initial analysis results 210 pass quality control 410 (step 906). For example, one or more analysis tools 608 may generate QC metrics 634 in analyzing the raw sequence data 140, and the QC metrics 634 may be evaluated to determine whether the QC metrics 634 exceed a quality threshold. In another example, data management controller 404 may provide or send the initial analysis results 210 to a data analyst, a domain expert, a technician, etc., for evaluation, and receive input indicating whether the initial analysis results 210 pass quality control 410.

After completion of the initial analysis, data management controller 404 performs storage control 408 to control electronic storage of the raw sequence data 140 (step 908). When the initial analysis results 210 pass quality control 410, data management controller 404 stores the raw sequence data 140 in archive storage 504 (step 910). For example, data management controller 404 may execute a function call or the like to store the raw sequence data 140 in archive storage 504. Data management controller 404 also deletes the raw sequence data 140 from external data repository 154 of the external genomics service 150 (step 912), such as after a configurable time period. For example, data management controller 404 may execute a function call or the like to delete the raw sequence data 140 from external data repository 154. When the initial analysis results 210 do not pass quality control 410, data management controller 404 may retain the raw sequence data 140 in external data repository 154 of the external genomics service 150 (step 914), and/or may perform further procedures that are outside the scope of this disclosure. One technical benefit is the raw sequence data 140 is moved from the external genomics service 150 to archive storage 504 after analysis, which reduces the cost associated with storage of the raw sequence data 140.

After the initial run 901 on the raw sequence data 140, there may be a need for updated analysis results 210 from the raw sequence data 140. For example, new analysis tools 608 may be deployed, updated versions of the analysis tools 608 may be deployed, a request for re-analysis may be for analysis results 210 associated with a different disease, etc. Thus, a subsequent run of data analysis may be performed on the raw sequence data 140.

The steps in FIG. 9B represent a subsequent run 921 of data analysis on the raw sequence data 140. Data management controller 404 detects an event triggering re-analysis on the raw sequence data 140 (step 922). The event triggering re-analysis on the raw sequence data 140 may vary depending on programming and/or operating conditions. In one example, data management controller 404 may detect a subsequent request to perform data analysis on the raw sequence data 140 (optional step 940), such as from the health care provider or the like. One technical benefit is a requesting party has flexibility in requesting further analyses of raw sequence data 140. In another example, data management controller 404 may detect a change to the analysis tool(s) 608 used to perform a prior analysis (e.g., the initial analysis) on the raw sequence data 140 (optional step 942), such as addition of a new analysis tool 608, an update (i.e., new or updated version) to an analysis tool 608, etc. One technical benefit is raw sequence data 140 may be re-analyzed with different or updated tools.

In response to detecting the event, data management controller 404 identifies a storage location of the raw sequence data 140 (step 924). For example, data management controller 404 may process metadata 546 associated with the raw sequence data 140 (i.e., the raw sequence data file 540 containing the raw sequence data 140) to determine the storage location of the raw sequence data 140 (optional step 944). One technical benefit is the data management controller 404 may quickly identify the location of the raw sequence data 140 by accessing the metadata 546. When the storage location is in external data repository 154 of the external genomics service 150, data management controller 404 launches one or more analysis tools 608 to perform re-analysis on the raw sequence data 140, and to output, generate, or produce updated analysis results 210 (step 926). Because the primary storage 512 of external data repository 154 is accessible in real-time, data management controller 404 may launch the analysis tool(s) 608 immediately to process the raw sequence data 140.

When the storage location is in archive storage 504, data management controller 404 initiates a restore of the raw sequence data 140 from archive storage 504 (step 928). For example, data management controller 404 may execute a function call or the like to archive storage 504 to restore the raw sequence data 140 to primary storage 502 of data repository 412. Because archive storage 504 is not accessible or available in real-time, data management controller 404 waits a threshold time period for the raw sequence data 140 to be restored from archive storage 504 to primary storage 502 of data repository 412 (step 930). The threshold time period may depend on an estimated retrieval time from archive storage 504, such as eight hours, ten hours, twelve hours, or another retrieval time. The retrieval time may be specified or guaranteed via a Service Level Agreement (SLA), and the threshold time period may be set or determined based on the SLA for archive storage 504. After the threshold time period, data management controller 404 launches one or more analysis tools 608 to perform re-analysis on the raw sequence data 140, and to output, generate, or produce updated analysis results 210 (step 932). One technical benefit is the raw sequence data 140 may be retrieved from archive storage 504 for re-analysis, which reduces the cost associated with storage of the raw sequence data 140. Re-analysis may be infrequent, so the raw sequence data 140 may be stored in archive storage 504 until it is potentially needed for re-analysis.

Data management controller 404 determines whether the updated analysis results 210 pass quality control 410 (step 906), as described above. Data management controller 404 may then perform storage control 408 to control electronic storage of the raw sequence data 140, such as described in step 908 of FIG. 9A. When the updated analysis results 210 pass quality control 410, data management controller 404 stores the raw sequence data 140 in archive storage 504 (step 910), and may delete the raw sequence data 140 from the external data repository 154 (step 912). The steps of storage control 408 after re-analysis may vary depending on programming and/or operating conditions. For example, when restoring the raw sequence data 140 from archive storage 504 in step 928, data management controller 404 may restore a temporary copy of the raw sequence data 140 from archive storage 504. Thus, the raw sequence data 140 is retained in archive storage 504, and the temporary copy is deleted from the external data repository 154 after a configurable time period.

Method 900 may be repeated for different raw sequence data 140. One technical benefit is the raw sequence data 140 for one or more sequencing participants 206 is dynamically moved between external data repository 154 of the external genomics service 150 and archive storage 504 as needed to reduce the storage costs. This makes long-term storage of genomic data feasible on a larger scale.

In an embodiment, data management controller 404 may dynamically determine whether to restore the raw sequence data 140 from archive storage 504 based on the requirements of the analysis tools 608. For example, data management controller 404 may determine whether one or more analysis tools 608 of an analysis pipeline 438 requires a raw sequence data file 540 encoded in a standard file format 544 as input, such as a FASTQ file 720. When one or more analysis tools 608 requires a raw sequence data file 540 as input, data management controller 404 initiates a restore of the raw sequence data 140 from archive storage 504 (step 928). One technical benefit is data management controller 404 initiates the restore in limited scenarios where an analysis tool 608 requires a raw sequence data file 540.

EXAMPLE

In the following example, additional processes, systems, and methods may be described in the context of managing genomic data. The processes, systems, and methods described in this example may be incorporated in embodiments described above as desired.

Figure 10:
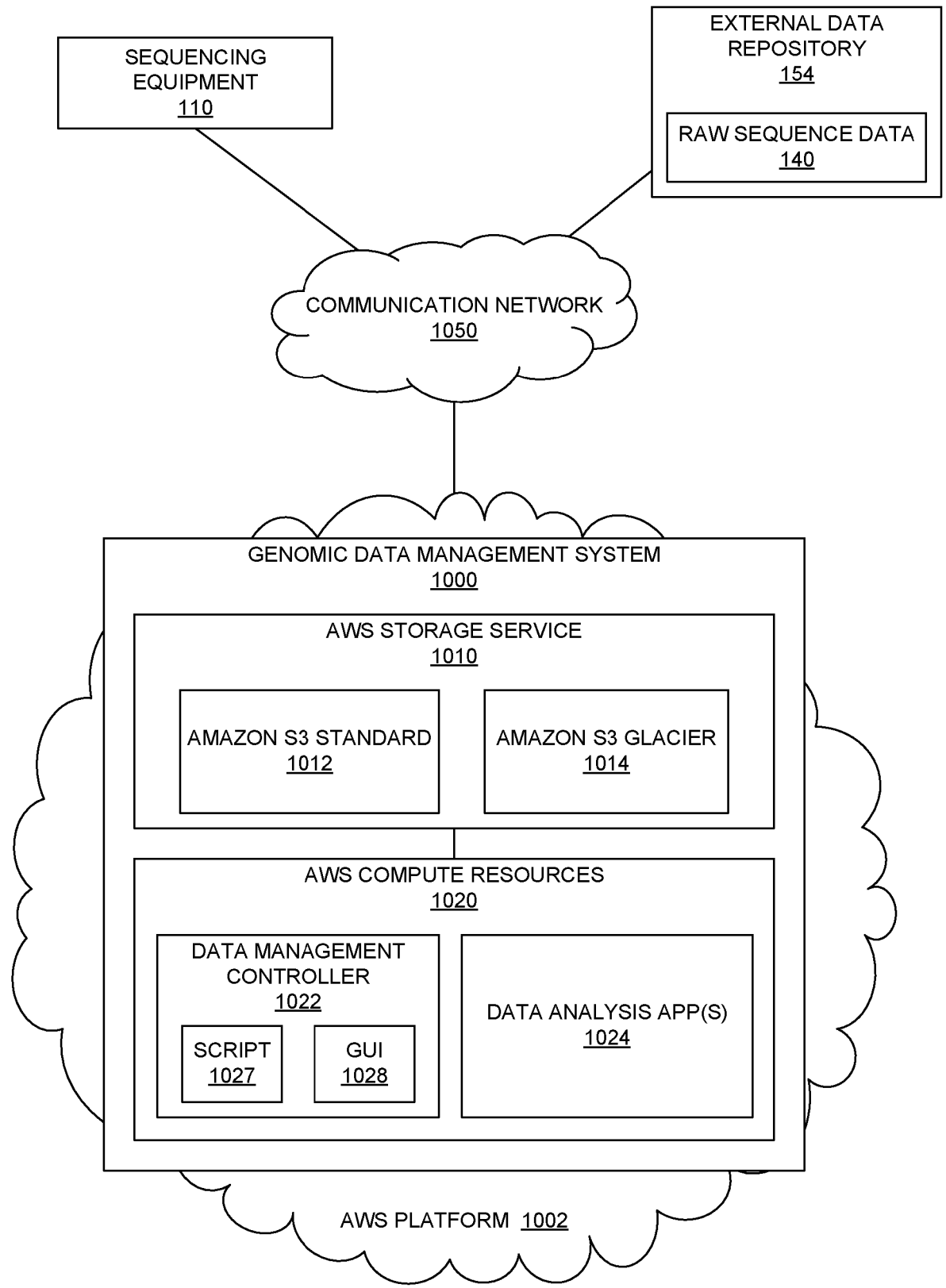
FIG. 10 illustrates a cloud-based genomic data management system in an illustrative embodiment.

FIG. 10 illustrates a cloud-based genomic data management system 1000 in an illustrative embodiment. Genomic data management system 1000 is configured to collect, store, and/or analyze genomic data. Genomic data management system 1000 is an example of genomic data management system 112 implemented on an AWS platform 1002. AWS is a platform that offers flexible and scalable cloud computing solutions. In an embodiment, AWS platform 1002 provides AWS storage services 1010 for scalable and secure storage of data. One of the AWS storage services 1010 (or storage classes) is Amazon Simple Storage Service (Amazon S3) standard 1012 (e.g., Amazon S3 bucket). Amazon S3 standard 1012 is an example of primary storage 502 described above. Another one of the AWS storage services 1010 (or storage classes) is Amazon S3 Glacier 1014. Amazon S3 Glacier 1014 (e.g., Flexible Retrieval or Deep Archive) is an example of archive storage 504 described above. For example, Amazon S3 Glacier Flexible Retrieval provides configurable retrieval times from a few minutes to hours. Amazon S3 Glacier Deep Archive provides a retrieval time within twelve hours.

AWS platform 1002 also provides AWS compute resources 1020, such as Amazon Elastic Compute Cloud (EC2) services for scalable and reliable processing. Compute resources 1020 may be used to implement a data management controller 1022 as described above. For example, one or more scripts 1027 or logic may be encoded on the AWS platform 1002 to perform functions of the data management controller 1022. Compute resources 1020 may be used to implement one or more data analysis applications 1024. A data analysis application 1024 may be referred to as a native application, which is a type of analysis tool 608 built on the AWS platform 1002 to analyze genomic data. One or more data analysis applications 1024 may be combined within an analysis pipeline 438 as discussed above.

Genomic data management system 1000 is configured to communicate with external systems or devices via a communication network 1050. Communication network 1050 may comprise a Wide Area Network (WAN), such as the Internet, a telecommunications network, an enterprise network or private network, a Wireless Local Area Network (WLAN), etc., or any combination thereof.

In an embodiment, external data repository 154 receives and stores raw sequence data 140 for a sequencing participant 206. For example, a biological sample 204 for the sequencing participant 206 may be received at a laboratory 132 for sequencing at sequencing equipment 110. In general, laboratory procedures related to genetics may include accessioning, sample plating, storage, extraction, library preparation, enrichment, and sequencing processes. These processes acquire genetic material from a sample 204, separate the genetic material from other constituents, duplicate the genetic material, and quantify the genetic material order to determine a swathe of sequence data, such as an exome or entire genome for a subject (e.g., a human, an animal, a pathogen, an organelle, etc.).

Sequencing may be performed according to any of a variety of techniques, including short-read and long-read techniques. In one embodiment, the sequencing is performed as Sequencing by Synthesis (SBS) at genetic analyzer equipment. For example, sets of enriched libraries of genetic material bound to probes in earlier steps may be transferred to a flow cell, and annealed to oligonucleotide probes within the flow cell. At this stage, the contents of multiple wells may be applied to the same flow cell, because the libraries within those wells are tagged with the chemical identifiers. In one embodiment, the chemical identifiers comprise nucleotide sequences that are detectable during the sequencing process to determine a corresponding Laboratory Sample Identifier (LSI).

Complementary sequences may then be created via enzymatic extension to create a double-stranded portion of genetic material. The double-stranded genetic material may then be denatured, and the library fragment may be washed away. Bridge amplification may then be performed to create copies of the remaining molecule in a localized cluster. For example, a cluster may comprise twenty to fifty copies of the same molecule, localized to a location the size smaller than a pinhead on the flow cell.

Sequencing primers are annealed to library adapters in order to prepare the flow cell for SBS. During SBS, the sequencing primer uses reverse terminator fluorescent oligonucleotides, one base per cycle, for a number of cycles (e.g., one hundred and fifty cycles) in the forward direction. After the addition of each nucleotide, clusters are excited by a light source, resulting in fluorescence which can be measured. The emission wavelength and signal intensity for each cluster determines a base call for that cluster. Fluorescent moieties are then flushed from the flow cell. A chemical group blocking a 3' end of the fragment is then removed, enabling a subsequent nucleotide to be read. This tightly controls nucleotide addition and detection.

Base calls across cycles at the same physical location on the flow cell occur at the same cluster, and hence indicate sequential reads for copies of the same fragment of the genetic material. After each cycle, denaturing and annealing are performed to extend the index primer. A complementary reverse strand is created and extended via bridge amplification. The reverse strand is then read in the reverse direction for a number of cycles, in a manner similar to reads in the forward direction.

Depending on whether a complete human genome, or another set of genomic data, is being tested, different reagents (e.g., probes, primers, etc.) may be chosen. That is, different reagents may be utilized for library preparation for a pathogen (e.g., bacteria, virus) or an organelle (e.g., mitochondria) than for a human genome. Pathogens exhibiting Ribonucleic Acid (RNA) genomes may have their genetic material translated to DNA before sequencing, enrichment, and/or library preparation are performed, via known techniques, such as Next Generation Sequencing (NGS) techniques.

Throughout the processes discussed above, the laboratory environment may be carefully controlled to ensure quality. For example, temperature within each segment of the laboratory may be carefully monitored and controlled, and ultraviolet lighting or other features capable of inactivating genetic material may be carefully positioned to ensure that contamination does not occur.

In some embodiments, genetic material is used for detection of a pathogen rather than for sequencing. Detecting a pathogen may involve the use of a real-time Polymerase Chain Reaction (PCR) system that performs PCR. The real-time PCR system may further add a reactive agent to individual wells of a library preparation microplate, that fluoresces when bound to genetic material for the pathogen. By analyzing fluorescence at known periods of time after PCR has initiated, presence of a pathogen is determined. Genetic testing for a pathogen may thereby forego sequencing in some embodiments.

Raw sequence data 140 generated during synthesis may be stored in a non-standard file format, such as Binary Base Call (BCL), depending on the sequencing equipment 110 used. This raw data may be fed to an analytical pipeline (i.e., one or more of analysis pipelines 438), such as a cloud-based computing environment (e.g., AWS platform 1002). Raw sequence data may be processed by the analytical pipeline into a standard file format, such as a text-based FASTQ format 810, that reports the sequence information (i.e., the sequence reads) and corresponding quality scores. The raw sequence data is then analyzed to perform alignment of sequence reads to a reference genome, such as a reference genome reported in a Browser Extensible Data (BED) file. The aligned sequence data may be reported as a BAM file 724. The aligned sequence data may then be called, resulting in a VCF file 726 reporting called variants at each location of the genome that was sequenced, together with secondary metrics, such as quality indicator metrics.

The called sequence data may be provided to a data analyst via a User Interface (UI), such as a GUI presented via a display. The technician may then validate the resulting called sequence data and release it for reporting to subjects, health care providers, and/or scientists. The raw sequence data, the called sequence data, and/or any annotations provided by a data analyst forms the sequencing data 508 that is stored.

Figure 11:
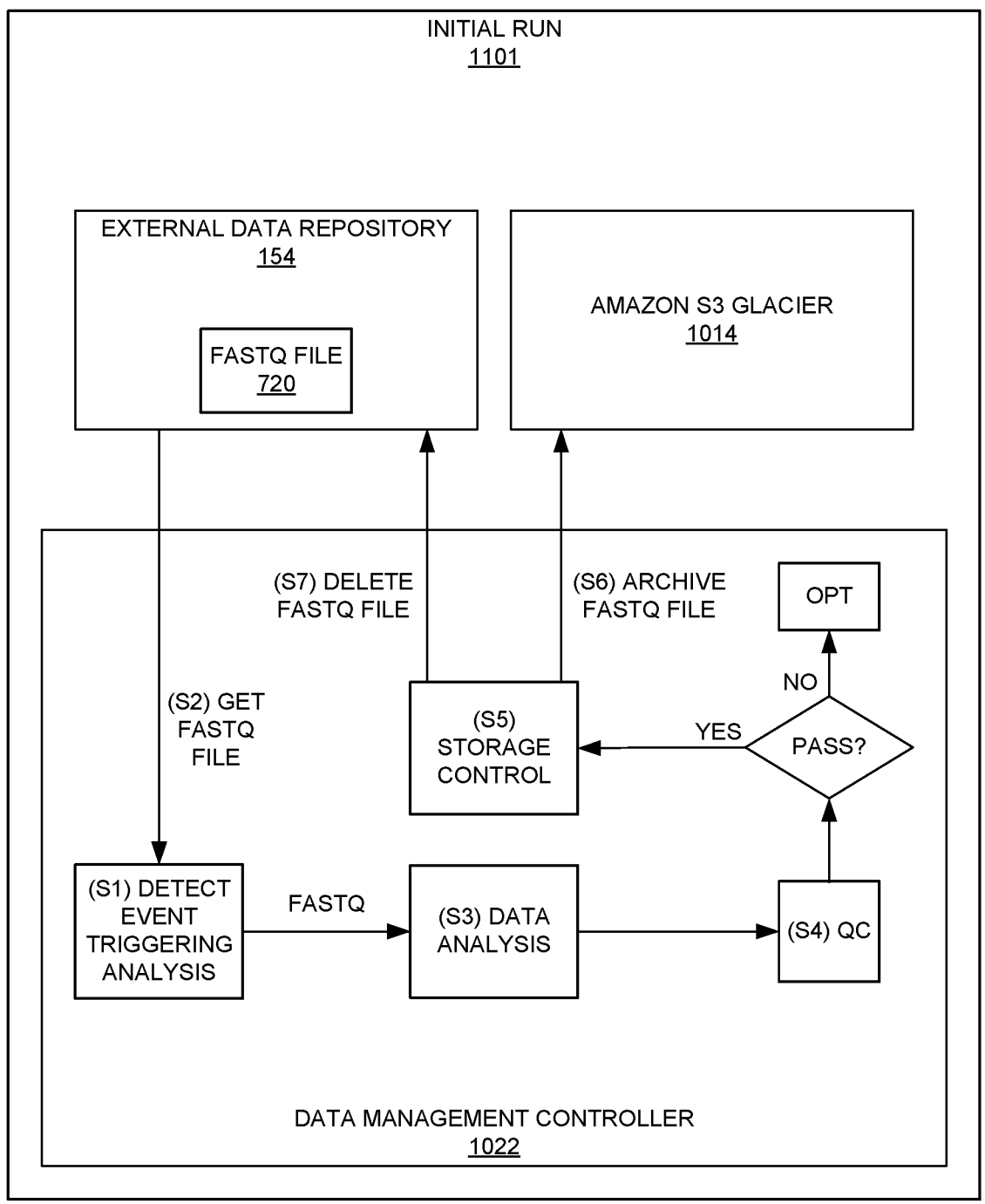
FIG. 11 represents an initial run of data analysis on a FASTQ file in an illustrative embodiment.
Figure 12:
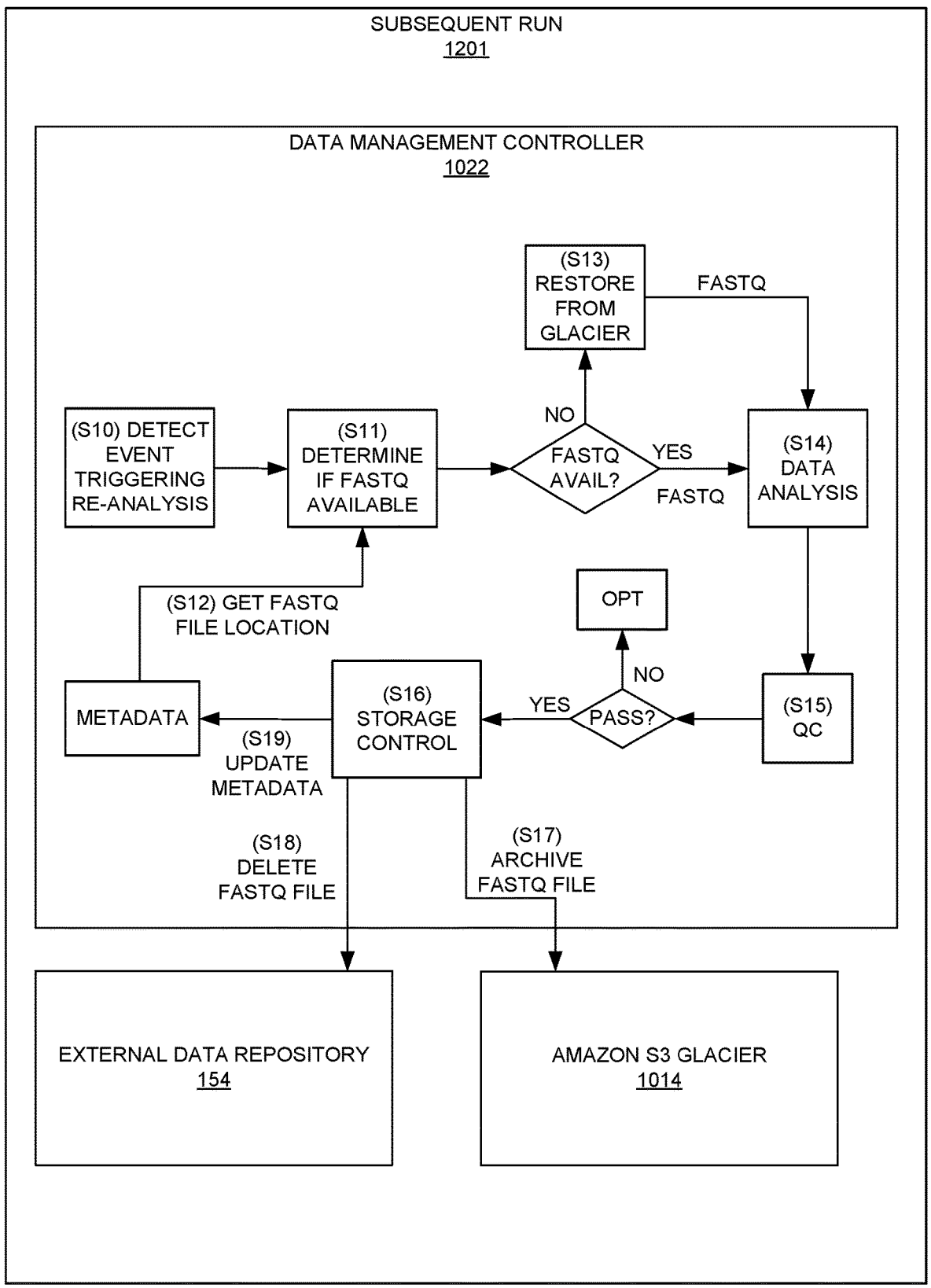
FIG. 12 represents a subsequent run of data analysis on a FASTQ file in an illustrative embodiment.

FIGS. 11-12 are functional diagrams illustrating operations of genomic data management system 1000 in an illustrative embodiment. Assume, for example, that sequencing equipment 110 performs a sequencing process on a sample 204 to generate raw sequence data 140 for a sequencing participant 206, as shown in FIG. 10. The raw sequence data 140 may be streamed from the sequencing equipment 110 in real-time to external data repository 154 of the external genomics service 150. In an embodiment, the raw sequence data 140 may comprise a FASTQ file 720, or may comprise a file in a non-standard file format that is converted to a FASTQ file 720.

FIG. 11 represents a first or initial run 1101 of data analysis on the FASTQ file 720 in an illustrative embodiment. Data management controller 1022 detects an event triggering initial analysis on the FASTQ file 720 (S1). For example, data management controller 1022 may detect an initial request to perform data analysis on the raw sequence data 140 in the FASTQ file 720, may detect receipt of the FASTQ file 720, may detect conversion of a BCL file to a FASTQ file 720, etc. However, other triggering events are considered herein. In response to the triggering event, data management controller 1022 retrieves the FASTQ file 720 from external data repository 154 (S2). Data management controller 1022 launches one or more data analysis applications 1024 to perform the initial analysis on the raw sequence data 140 in the FASTQ file 720 (S3). For example, data management controller 1022 may select or identify an analysis pipeline 438 for the initial run 1101 of data analysis, and execute function calls or the like to feed the raw sequence data 140 through the analysis pipeline 438 to produce analysis results 210 (e.g., a VCF file 726 and QC metrics 634).

Data management controller 1022 then determines whether the initial analysis on the raw sequence data 140 passes quality control 410 (S4). For example, data analysis applications 1024 may generate QC metrics 634 during analysis, and data management controller 1022 may evaluate the QC metrics 634 to determine whether the metrics exceed a quality threshold. A data analysis application may be used for calling ancestry of a patient, may include a Burrows-Wheeler Aligner (BWA) process to map low-divergent sequences (e.g., in a FASTQ format generated by a sequencing machine) against a large reference genome reported in a Binary Alignment Map (BAM) file, may utilize the Genome Analysis Toolkit (GATK) from the Broad Institute in order to perform variant calling, etc. In further embodiments, the analytical tools may be machine learning models that are re-trained or altered over time.

Quality control 410 may generate Quality Control (QC) scores (e.g., numerical or binary results) that are determined based on a combination of a known accuracy of the data analysis applications on a set of training data, the quality of underlying genomic data (e.g., a confidence of each variant call), and/or other metrics such as completeness of output or callability. Generally, callability is a percentage of targeted regions that have been successfully called (e.g., as opposed to being assigned a "NOCALL" by variant calling software). The QC for reporting Copy Number Variants (CNVs) may be determined by a statistical technique such as Goodness of Fit (GOF) applied to the data, as compared to GOF known for baseline data. In some instances, the QC score comprises a binary result, such as PASS or FAIL. This may be particularly beneficial for certain data analysis applications (e.g., tools which check for MSH2 inversion). Numerical QC scores may be normalized to a predefined range, such as between 0 and 100, or between 0 and 1. For analytical tools with a binary output for QC, a value of one may correspond with a PASS and a value of zero may correspond with a FAIL.

In further embodiments, QC scores may indicate an amount of gene dispersion (e.g., a measurement of an amount that variance deviates from a mean value of read counts for a gene), a percentage of coverage uniformity for autosomes, or a callability of SNPs. For certain tests, callability or dispersion may be specific to a data analysis application designed for that test. For example, callability may indicate a fraction of loci reviewed by the data analysis application that have more than a threshold amount of depth (e.g., ten reads, twenty reads, etc.), or coverage. In a further example, dispersion measured by the data analysis application may indicate median dispersion across loci read by the data analysis application, with dispersion calculated for read count covering each target across samples in a batch. In further embodiments, QC scores describe metrics that may be used to determine a need for resequencing or acquiring a new sample for a patient. Examples include a ratio of human DNA to bacterial DNA, an amount of fold enrichment, a percentage of DNA corresponding with non-human animals or corresponding with yeast, a freemix score, or a percentage of on-bait capture.

Quality control 410 may associate a minimum quality score for each of multiple tests considered by data analysis applications. Different tests may have different minimum quality scores, even for the same portions of genomic data. Example minimum quality scores may be ninety-nine percent (or higher) for callability, 0.01 (or lower) for dispersion, five percent (or lower) for bacteria to human ratio, twenty (or higher) for fold enrichment, etc. As used herein, a minimum quality score refers to a lowest acceptable amount of quality, rather than a lowest numerical value. Thus, a minimum quality score may correspond with a lowest acceptable numerical value or highest acceptable numerical value, depending on the quality metric being considered, and whether or not lower numerical values indicate lower quality.

In another example, data management controller 1022 may provide a Graphical User Interface (GUI) 1028 to display the QC metrics 634 to a data analyst, a domain expert, a technician, etc. The technician may then validate the QC metrics and release the associated analysis results (e.g., VCF).

When the initial analysis does not pass quality control 410, the VCF file 726 may be discarded or sent for re-analysis by one or more data analysis applications. In an embodiment, the sample may be re-queued for re-sequencing, the existing sequencing data may be re-analyzed for the sample, a corresponding patient may be scheduled for re-sampling of genetic material, and/or issue a manual pass. When the initial analysis passes quality control 410, data management controller 1022 performs storage control 408 to control electronic storage of the FASTQ file 720 (S5). To control electronic storage of the FASTQ file 720, data management controller 1022 stores the FASTQ file 720 in Amazon S3 Glacier 1014 (S6). For example, data management controller 1022 may generate or execute an API call to Amazon S3 Glacier 1014 to store the FASTQ file 720. Data management controller 1022 also deletes the FASTQ file 720 from external data repository 154 (S7), such as after a configurable time period. For example, data management controller 1022 may generate or execute an API call to delete the FASTQ file 720. Data management controller 1022 may perform similar storage control 408 for other "large" files (e.g., more than one gigabyte) associated with genomic data for the sequencing participant, such as SAM files 722, BAM files 724, etc. One technical benefit is large files are moved from external data repository 154 to Amazon S3 Glacier 1014 after initial analysis, which reduces the cost associated with storage of the files.

After the initial run 1101 on the FASTQ file 720, there may be a need for updated analysis results 210 from the raw sequence data 140 in the FASTQ file 720. For example, new data analysis applications 1024 may be deployed, updated versions of the data analysis applications 1024 may be deployed, a request for re-analysis may be for analysis results 210 associated with a different disease, etc. Thus, a subsequent run of data analysis may be performed on the FASTQ file 720.

FIG. 12 represents a subsequent run 1201 of data analysis on the FASTQ file 720 in an illustrative embodiment. Data management controller 1022 detects an event triggering re-analysis on the FASTQ file 720 (S10). The event triggering re-analysis on the FASTQ file 720 may vary depending on programming and/or operating conditions. In one example, data management controller 1022 may detect a subsequent request to perform data analysis on the FASTQ file 720, such as from the health care provider or the like. In another example, data management controller 1022 may detect a change to one or more of the data analysis applications 1024 used to perform a prior analysis (e.g., the initial analysis) on the FASTQ file 720, such as addition of a data analysis applications 1024, an update (i.e., new or updated version) to data analysis applications 1024, etc.

Data management controller 1022 determines whether the FASTQ file 720 is available in external data repository 154 (S11). To do so, data management controller 1022 may process metadata associated with the FASTQ file 720 to determine the storage location of the FASTQ file 720 (S12). When the FASTQ file 720 is stored in external data repository 154, the FASTQ file 720 is accessible in real-time. Thus, data management controller 1022 may launch one or more data analysis applications 1024 to perform re-analysis on the raw sequence data 140 in the FASTQ file 720 (S14). Because external data repository 154 is accessible in real-time, data management controller 1022 may launch the data analysis applications 1024 immediately.

When the FASTQ file 720 is stored in Amazon S3 Glacier 1014 and not external data repository 154, data management controller 1022 initiates a restore of the FASTQ file 720 from Amazon S3 Glacier 1014 to Amazon S3 standard 1012 (S13). For example, data management controller 1022 may generate or execute an API call to Amazon S3 Glacier 1014 to restore the FASTQ file 720 to Amazon S3 standard 1012. The retrieval time of Amazon S3 Glacier 1014 may be about twelve hours. Thus, data management controller 1022 waits a threshold time period for the FASTQ file 720 to be restored from Amazon S3 Glacier 1014. After the threshold time period, data management controller 1022 launches one or more data analysis applications 1024 to perform re-analysis on the raw sequence data 140 in the FASTQ file 720 (S14). For example, data management controller 1022 may select or identify an analysis pipeline 438 for the subsequent run 1201 of data analysis, and execute function calls or the like to feed the FASTQ file 720 through the analysis pipeline 438 to produce analysis results 210 (e.g., a VCF file 726 and QC metrics 634). One technical benefit is the FASTQ file 720 may be retrieved from Amazon S3 Glacier 1014 for re-analysis, which reduces the cost associated with storage of the FASTQ file 720. Re-analysis may be infrequent, so the FASTQ file 720 may be stored in Amazon S3 Glacier 1014 until it is potentially needed for re-analysis.

Data management controller 1022 then determines whether the subsequent analysis on the raw sequence data 140 passes quality control 410 (S15). When the subsequent analysis does not pass quality control 410, one or more optional steps may be performed that are outside of this disclosure. When the subsequent analysis passes quality control 410, data management controller 1022 performs storage control 408 to control electronic storage of the FASTQ file 720 (S16), and/or other large files, as discussed above. To control electronic storage of the FASTQ file 720, data management controller 1022 stores the FASTQ file 720 in Amazon S3 Glacier 1014 (S17), and deletes the FASTQ file 720 from external data repository 154 (S18), such as after a configurable time period. Data management controller 1022 may also update the metadata associated with the FASTQ file 720 to indicate the present storage location of the FASTQ file 720 (S19). One technical benefit is large files are moved from external data repository 154 to Amazon S3 Glacier 1014 after re-analysis, which reduces the cost associated with storage of the files.

Although specific embodiments were described herein, the scope of the invention is not limited to those specific embodiments. The scope of the invention is defined by the following claims and any equivalents thereof.

What is claimed is:

1. An apparatus, comprising:
   a data management controller communicatively coupled to at least one data repository over a communication network, wherein the at least one data repository comprises primary storage comprising a class of storage where data is accessible in substantially real-time, and further comprises archive storage comprising a class of storage where data is not accessible in real-time;
   the data management controller comprising a processor and memory, the processor configured to:
      detect a first event triggering initial analysis on raw sequence data encoded in a standard file format, wherein the raw sequence data is stored in the primary storage;
      select an analysis pipeline for the initial analysis from a plurality of analysis pipelines based on local policy;
      execute one or more function calls to launch one or more analysis tools of the selected analysis pipeline for the initial analysis to perform the initial analysis on the raw sequence data accessible from the primary storage in substantially real-time, and to output initial analysis results;
      determine whether the initial analysis results pass quality control; and
      control electronic storage of the raw sequence data when the initial analysis results pass quality control by:
         executing one or more function calls to store the raw sequence data in the archive storage; and
         executing one or more function calls to delete the raw sequence data from the primary storage;
   the processor is further configured to:
      detect a second event triggering re-analysis on the raw sequence data;
      select an analysis pipeline for the re-analysis from the plurality of analysis pipelines having different or updated analysis tools from the selected analysis pipeline for the initial analysis; and
      identify a storage location of the raw sequence data in either the primary storage or the archive storage;
   when the storage location is in the archive storage, the processor is further configured to:
      execute one or more function calls to initiate a restore of the raw sequence data from the archive storage;
      wait a threshold time period for the raw sequence data to be restored from the archive storage; and
      after the threshold time period, execute one or more function calls to launch the analysis tools of the selected analysis pipeline for the re-analysis to perform the re-analysis on the raw sequence data restored from the archive storage, and to output the updated analysis results.

2. The apparatus of claim 1, wherein:
   the standard file format comprises FASTQ format.

3. The apparatus of claim 1, wherein the processor is further configured to:
   detect an initial request to perform the initial analysis on the raw sequence data as the first event.

4. The apparatus of claim 1, wherein the processor is further configured to:
   detect conversion of the raw sequence data to the standard file format as the first event.

5. The apparatus of claim 1, wherein:
   when the storage location is in the primary storage, the processor is further configured to:
      execute one or more function calls to launch the analysis tools of the selected analysis pipeline for the re-analysis to perform the re-analysis on the raw sequence data accessible from the primary storage in substantially real-time, and to output updated analysis results.

6. The apparatus of claim 1, wherein the processor is further configured to:
   detect a subsequent request to perform the re-analysis on the raw sequence data as the second event.

7. The apparatus of claim 1, wherein the processor is further configured to:
   detect a change to at least one of the analysis tools used to perform a prior analysis on the raw sequence data as the second event.

8. The apparatus of claim 7, wherein:
   metadata associated with the raw sequence data indicates at least one of the analysis tools used to process the raw sequence data, or a version of the analysis tools used to process the raw sequence data.

9. The apparatus of claim 1, wherein the processor is further configured to:
   process metadata associated with the raw sequence data to identify the storage location.

10. The apparatus of claim 1, wherein:
    the processor and the memory comprise processing resources and storage resources provisioned on a cloud computing platform.

11. A method, comprising:
in a data management controller communicatively coupled to at least one data repository over a communication network, wherein the at least one data repository comprises primary storage comprising a class of storage where data is accessible in substantially real-time, and further comprises archive storage comprising a class of storage where data is not accessible in real-time:
detecting a first event triggering initial analysis on raw sequence data encoded in a standard file format, wherein the raw sequence data is stored in the primary storage;
selecting an analysis pipeline for the initial analysis from a plurality of analysis pipelines based on local policy;
executing one or more function calls to launch one or more analysis tools of the selected analysis pipeline for the initial analysis to perform the initial analysis on the raw sequence data accessible from the primary storage in substantially real-time, and to output initial analysis results;
determining whether the initial analysis results pass quality control;
controlling electronic storage of the raw sequence data when the initial analysis results pass quality control by:
 executing one or more function calls to store the raw sequence data in the archive storage; and
 executing one or more function calls to delete the raw sequence data from the primary storage;
detecting a second event triggering re-analysis on the raw sequence data;
selecting an analysis pipeline for the re-analysis from the plurality of analysis pipelines having different or updated analysis tools from the selected analysis pipeline for the initial analysis;
identifying a storage location of the raw sequence data in either the primary storage or the archive storage;
when the storage location is in the archive storage:
 executing one or more function calls to initiate a restore of the raw sequence data from the archive storage;
 waiting a threshold time period for the raw sequence data to be restored from the archive storage; and
 after the threshold time period, executing one or more function calls to launch the analysis tools of the selected analysis pipeline for the re-analysis to perform the re-analysis on the raw sequence data restored from the archive storage, and to output the updated analysis results.

12. The method of claim 11, wherein:
the standard file format comprises FASTQ format.

13. The method of claim 11, wherein:
the detecting the first event comprises detecting an initial request to perform the initial analysis on the raw sequence data.

14. The method of claim 11, wherein:
the detecting the first event comprises detecting conversion of the raw sequence data to the standard file format.

15. The method of claim 11, further comprising:
when the storage location is in the primary storage, executing one or more function calls to launch the analysis tools of the selected analysis pipeline for the re-analysis to perform the re-analysis on the raw sequence data accessible from the primary storage in substantially real-time, and to output updated analysis results.

16. The method of claim 11, wherein:
the detecting the second event comprises detecting a subsequent request to perform the re-analysis on the raw sequence data.

17. The method of claim 11, wherein:
the detecting the second event comprises detecting a change to at least one of the analysis tools used to perform a prior analysis on the raw sequence data.

18. The method of claim 11, wherein:
the identifying the storage location comprises processing metadata associated with the raw sequence data.

19. A non-transitory computer readable medium embodying programmed instructions executed by a processor, wherein the instructions direct the processor to implement a method comprising:
in a data management controller communicatively coupled to at least one data repository over a communication network, wherein the at least one data repository comprises primary storage comprising a class of storage where data is accessible in substantially real-time, and further comprises archive storage comprising a class of storage where data is not accessible in real-time:
detecting a first event triggering initial analysis on raw sequence data encoded in a standard file format, wherein the raw sequence data is stored in the primary storage;
selecting an analysis pipeline for the initial analysis from a plurality of analysis pipelines based on local policy;
executing one or more function calls to launch one or more analysis tools of the selected analysis pipeline for the initial analysis to perform the initial analysis on the raw sequence data accessible from the primary storage in substantially real-time, and to output initial analysis results;
determining whether the initial analysis results pass quality control;
controlling electronic storage of the raw sequence data when the initial analysis results pass quality control by:
 executing one or more function calls to store the raw sequence data in the archive storage; and
 executing one or more function calls to delete the raw sequence data from the primary storage;
detecting a second event triggering re-analysis on the raw sequence data;
selecting an analysis pipeline for the re-analysis from the plurality of analysis pipelines having different or updated analysis tools from the selected analysis pipeline for the initial analysis;
identifying a storage location of the raw sequence data in either the primary storage or the archive storage;
when the storage location is in the archive storage:
 executing one or more function calls to initiate a restore of the raw sequence data from the archive storage;
 waiting a threshold time period for the raw sequence data to be restored from the archive storage; and
 after the threshold time period, executing one or more function calls to launch the analysis tools of the selected analysis pipeline for the re-analysis to perform the re-analysis on the raw sequence data restored from the archive storage, and to output the updated analysis results.

20. The computer readable medium of claim 19, wherein the method further comprises:
when the storage location is in the primary storage, executing one or more function calls to launch the analysis tools of the selected analysis pipeline for the re-analysis to perform the re-analysis on the raw sequence data accessible from the primary storage in substantially real-time, and to output updated analysis results.

* * * * *